Patented July 31, 1934

1,968,152

UNITED STATES PATENT OFFICE 1,968,152

PROCESS FOR ACCELERATING THE HARDENING OF HYDRAULIC BINDING MEANS

Walter Kirchner, Berlin, Germany, assignor to Chemische Fabrik Grünau, Landshoff & Meyer Aktiengesellschaft, Berlin-Grünau, Germany No Drawing. Application November 19, 1929, Serial No. 408,406. In Germany December 1, 1927

5 Claims. (Cl. 106—27)

The invention relates to a process for accelerating the hardening of hydraulic binding means and mortars. The process consists in adding to the hydraulic binding means a mixture of easily soluble calcium salt and one or several monobasic acid salts of a metal of the group consisting of tin or titanium, and, or the mineral acid itself, excepting sulphuric acid.

In practice it is often necessary to bring hydraulic binding means rapidly to a setting or solidifying condition, be it that the rush of water from the outer side or from the inner side requires rapid working, or be it for the speediest possible production of concrete blocks or other building elements. It has been proposed to add, for this purpose, calcium chloride to the hydraulic binding means such as Portland cement, slag cement, blast furnace slag cement, Roman cement and the like. This process possesses, however, certain inconveniences. It does accelerate the setting in certain cases, but frequently reduces the resistance of the concrete, or even leads to destruction. Also it has been proposed, to use mixtures of easily soluble calcium and aluminium salts.

According to the present invention easily soluble calcium salts are also employed, such as calcium chloride and calcium nitrate. These salts are however used in mixture with other chlorides or nitrates, as for example titanic or stannic chloride or nitrate and the like. Furthermore, calcium chloride, mixed with hydrochloric acid, or calcium nitrate mixed with nitric acid or alternately mixed, are also used and such mixtures are added to the hydraulic binding means prior to or during the working up.

The addition of the special salts effects an extraordinary increase of the efficiency of the calcium chloride or of the calcium nitrate.

The presence of free or only loosely bound strong mineral acid is specially favorable.

Besides the employment of mixtures of easily soluble calcium salt and other metallic salt, mixtures may be employed, which contain several metallic salts beside the easily soluble salts of the calcium, or mixtures of metallic salts with strong mineral acid beside calcium chloride and calcium nitrate. In such mixtures the presence of aluminium chloride or aluminium nitrate is specially favorable. Mixtures, which consist of calcium chloride and aluminium chloride or of the nitrates of these metals, and to which a metallic salt of the above-mentioned group and acid is added will therefore be used. Also in this case an addition of salts of titanium or tin is advisable.

The substances or mixtures of substance to be added can be added to the binding means in dry state, preferably prior to the working up, or in a dissolved state, for instance together with the mixing water. By altering the concentration proportions or the mixing proportions the beginning and duration of the setting can be regulated in such a manner that with the strongest concentrations the setting starts and is terminated most rapidly.

The importance of the process consists in that, beside the acceleration of the beginning of the setting and of the setting period and obtention of higher resistances, the cements or hydraulic binding means with the addition substances as stated are water-proof and oil-proof. Owing to the presence of the addition substances as stated an increase of temperature takes place during the setting, so that the binding means can be used also at frost, without any danger of injury by the frost.

The mixture according to the invention serves first for accelerating the hardening cements with a high content of lime, f. i. Portland-cement. This cement, according to tests, is caused to set very quickly by adding the described mixtures, sometimes at once, and very quickly hardens.

My process is more clearly set forth by the following specific examples, the details of which shall not be taken to limit the scope of the invention as claimed.

Example 1

3 parts by volume of a 17% calcium chloride solution are mixed with 1 part by volume of a 20% tin chloride solution. This mixture is added to Portland cement together with an additional 30% of liquid. This will result in a beginning of a setting of the cement in 1 minute and the setting will be complete in 22 minutes. The setting period of the cement may be changed by varying the proportions of the calcium chloride and the tin chloride of the mixture or by changing the proportion of the liquid added. If, for instance only the calcium chloride solution is mixed with the cement together with 30% additional liquid, the setting of the cement will start after 3 minutes and the setting will be complete after 1 hour.

If tin chloride alone is used together with cement and 70% of additional liquid the setting of the cement will start after 16 minutes and will be complete after 60 to 90 hours.

If only water were added to the cement the setting will ordinarily begin after 4 hours and be complete after 8 hours.

*Example 2*

3 parts by volume of a 17% calcium chloride solution are mixed with 1 part by volume of a 16% titanium tetrachloride solution. This mixture is added to Portland cement together with 30% of liquid. This mixture will result in a setting of the cement which will start after 1 minute and be complete in 8 minutes.

The setting time may be easily varied by regulating the proportions of these constituents.

If for instance only titanium tetrachloride solution is added to the cement an addition of 80% of liquid is found to be necessary and the setting of the mass will start after 21 minutes but was shown to be incomplete after 30 days.

I claim:

1. A process for the acceleration of the initial and final setting of a hydraulic binding material which comprises mixing with said binding material a calcium salt of a monobasic mineral acid together with a monobasic acid salt of a metal of the group consisting of tin and titanium.

2. A process for the acceleration of the initial and final setting of a hydraulic binding material which comprises mixing with said binding material a calcium salt of a monobasic mineral acid, an aluminum salt of a monobasic mineral acid and a monobasic acid salt of a metal of the group consisting of tin and titanium.

3. A process for the acceleration of the initial and final setting of a hydraulic binding material which comprises mixing with said binding material a calcium salt of a monobasic mineral acid, a monobasic acid salt of a metal of the group consisting of tin and titanium, and a monobasic mineral acid.

4. A process for the acceleration of the initial and final setting of a hydraulic binding material which comprises mixing with said binding material calcium chloride together with a chloride of a metal of the group consisting of tin and titanium.

5. A process for the acceleration of the initial and final setting of a hydraulic binding material which comprises mixing with said binding material calcium chloride together with a chloride of a metal of the group consisting of tin and titanium, and aluminum chloride.

WALTER KIRCHNER.